Sept. 15, 1942. W. E. GERTH 2,295,837
AUTOMOTIVE VEHICLE ANTISKID DEVICE
Filed Jan. 21, 1942 3 Sheets-Sheet 1
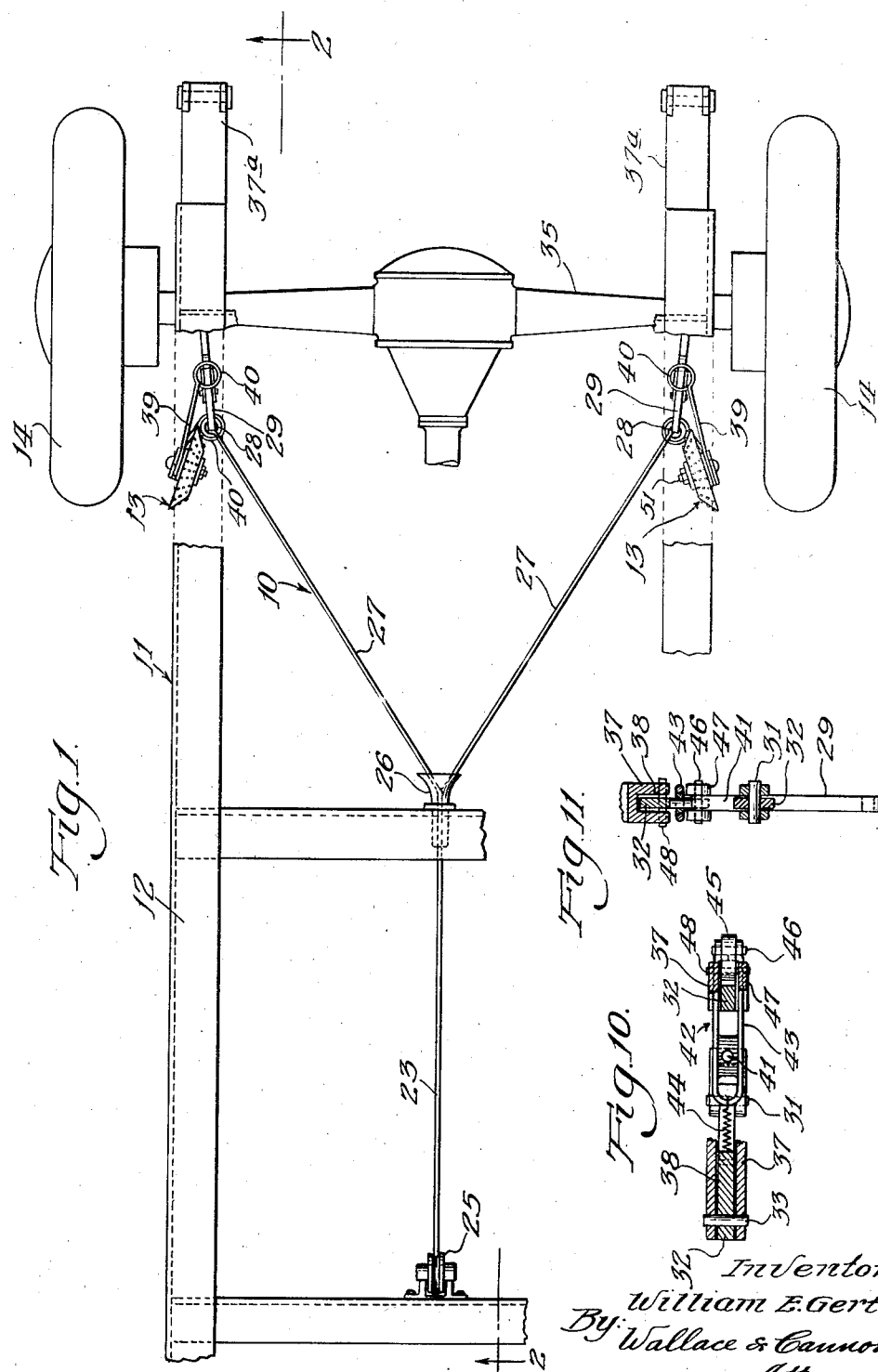
Inventor.
William E. Gerth
By Wallace & Cannon
Attorneys Sept. 15, 1942.　　　　W. E. GERTH　　　　2,295,837
AUTOMOTIVE VEHICLE ANTISKID DEVICE
Filed Jan. 21, 1942　　　　3 Sheets-Sheet 2
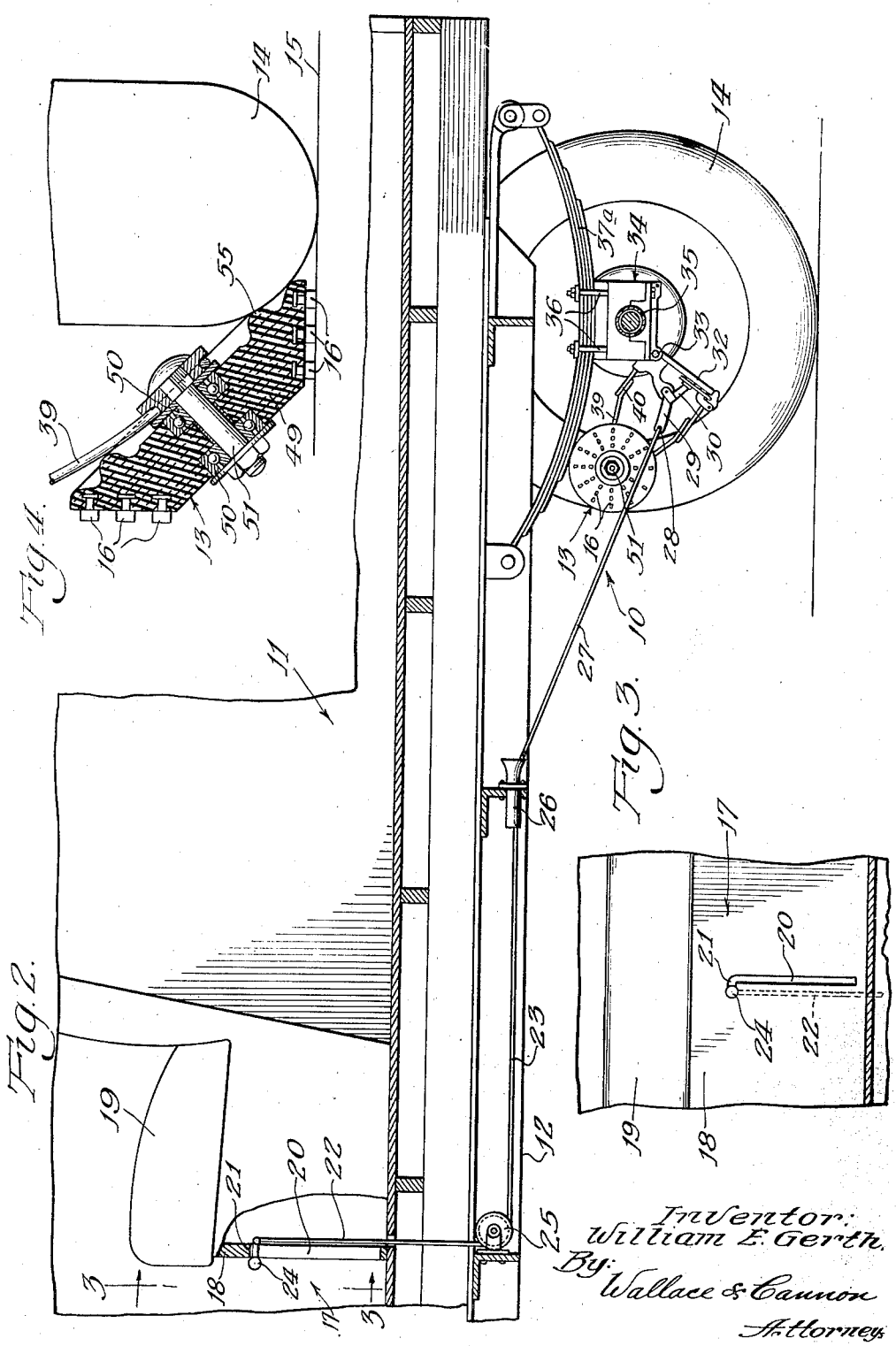
Inventor:
William E. Gerth,
By: Wallace & Cannon
Attorneys Sept. 15, 1942.                    W. E. GERTH                         2,295,837
                         AUTOMOTIVE VEHICLE ANTISKID DEVICE
                              Filed Jan. 21, 1942          3 Sheets-Sheet 3
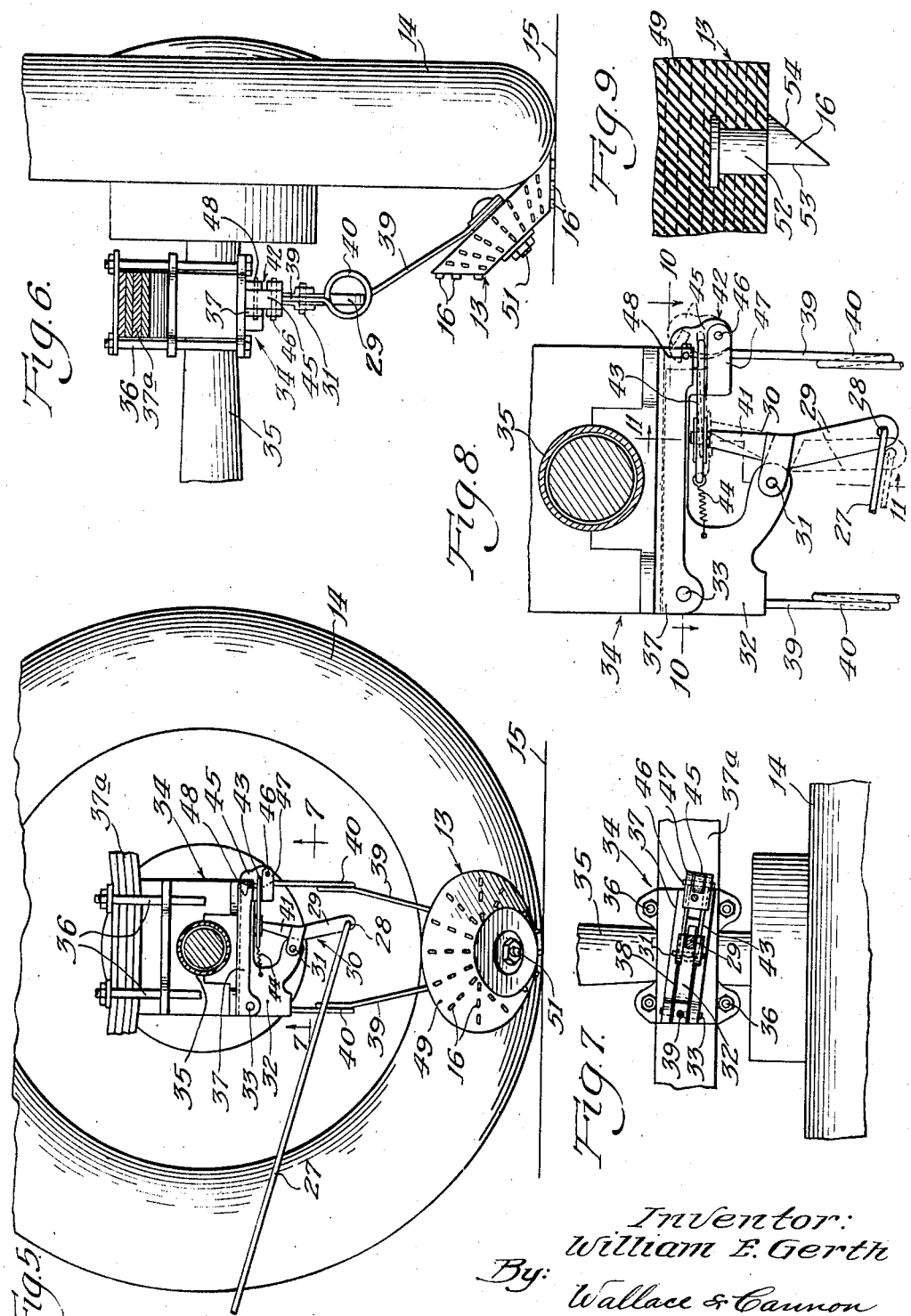
Inventor:
William E. Gerth
By: Wallace & Cannon
Attorneys Patented Sept. 15, 1942

2,295,837

UNITED STATES PATENT OFFICE 2,295,837

AUTOMOTIVE VEHICLE ANTISKID DEVICE

William E. Gerth, Chicago, Ill., assignor of forty-nine per cent to Karl Brenner, Chicago, Ill.

Application January 21, 1942, Serial No. 427,577

11 Claims. (Cl. 188—4)

This invention relates to an anti-skid device which is especially adapted for use on automotive vehicle trucks, buses and the like.

An object of the invention is to afford an improved and relatively simpler and more efficient anti-skid device for use on automotive vehicle trucks, buses and the like than has been provided heretofore.

A further object of the invention is to afford novel and relatively simple but efficient means for moving the tire-engaging and ground-gripping members, which are embodied in the device, into and out of effective and ineffective positions.

An additional object of the invention is to afford an improved and relatively simple but efficient device for retaining the tire-engaging and ground-gripping members in ineffective or raised position.

Another object of the invention is to afford an improved and relatively simple but efficient device for retaining the tire-engaging and ground-gripping members in effective or lowered position.

Still another object of the invention is to afford a novel device for guiding the tire-engaging and ground-gripping members into and out of effective and ineffective positions.

A further object of the invention is to afford a novel arrangement for urging the tire-engaging and ground-gripping members into engagement with the rear tires of an automotive vehicle truck, bus or the like, when the tire-engaging and ground-gripping members are in lowered or effective position.

An additional object of the invention is to afford an improved and relatively simple but efficient tire-engaging and ground-gripping member, which is embodied in the device, and novel and efficient anti-skid calks therefor.

Other and further objects of the present invention will be apparent from the following description and claims and will be understood by reference to the accompanying drawings which, by way of illustration, show preferred embodiments and the principles thereof and what I now consider to be the best mode in which I have contemplated applying those principles. Other embodiments of the invention embodying the same or equivalent principles may be used and structural changes may be made as desired by those skilled in the art without departing from the present invention and the purview of the appended claims.

In the drawings:

Fig. 1 is a top plan view of the chassis or frame of an automotive vehicle truck showing a preferred embodiment of the present invention mounted thereon;

Fig. 2 is a fragmental vertical longitudinal sectional view of an automotive vehicle truck showing parts of the new anti-skid device mounted thereon and showing one of the tire-engaging and ground-gripping members in ineffective or raised position;

Fig. 3 is a fragmentary front elevational view, on line 3—3 in Fig. 2, illustrating a part of the means by which the tire-engaging and ground-gripping members are latched in raised or ineffective position;

Fig. 4 is a vertical sectional view illustrating a preferred construction of one of the new tire-engaging and ground-gripping members and showing the same in lowered or effective position;

Fig. 5 is a fragmentary side elevational view showing one of the new tire-engaging and ground-gripping members attached in lowered or effective position;

Fig. 6 is an end elevational view of the parts shown in Fig. 5 and showing the parts in the same position in which they are shown in Fig. 5;

Fig. 7 is a bottom plan view on line 7—7 in Fig. 5, partly in section;

Fig. 8 is a fragmentary side elevational view illustrating the latching mechanism by means of which the tire-engaging and ground-gripping members are latched in lowered or effective position;

Fig. 9 is an enlarged fragmentary sectional detail view of one of the tire-engaging and ground-gripping members and showing in elevation one of the novel anti-skid calks embodied therein;

Fig. 10 is a sectional top plan view on line 10—10 in Fig. 8; and

Fig. 11 is a vertical sectional view on line 11—11 in Fig. 8.

A typical and preferred embodiment of the present invention is illustrated in the drawings, wherein it is generally indicated at 10, and wherein it is shown as being associated with an automotive vehicle truck 11, only a part of which is shown, and the classis or frame of which is generally indicated at 12.

The new anti-skid device includes a pair of yieldable or resilient tire-engaging and ground-gripping members, which are generally indicated at 13, and which will be described in detail hereinafter, one of the same being associated with each of the rear wheels of the automotive vehicle truck 11, and in a manner which will be described hereinafter.

The tire-engaging and ground-gripping members 13 are shown, in Figs. 5 and 6, in effective or lowered position and when in this position, it will be noted, they engage the rear tires 14 of the automotive vehicle truck, bus or the like 11, and are pressed thereby against and into frictional engagement with the ground or pavement 15 over which the vehicle and the tires 14 are moving so as to urge the anti-skid calks 16, which are imbedded in and carried by the tire-engaging and ground-gripping members 13, into engagement with the ice-covered or wet ground, pavement, or other slippery surface over which the vehicle and the tires 14 are moving. However, during the normal operation of the vehicle the tire-engaging and ground-gripping members 13 are held in raised or ineffective position, as shown in Fig. 2, but they are readily releasable from this position by means which will now be described, so that they may be dropped down into lowered or effective and tire-engaging and ground-gripping position, as shown in Figs. 4, 5 and 6.

The driver's compartment of the truck or like automotive vehicle, with which the new anti-skid device is associated, is indicated at 17 (Fig. 2) and includes an upright wall 18 which is disposed below the driver's seat 19, at the front thereof, and provided in this wall 18 is a vertically extending bayonet guide slot 20 having a horizontally extending latching portion 21 at the upper end thereof.

Working in and guided in the slot 20 is the upper end portion 22 of a flexible cable 23 and attached to the upper end portion 22 of this cable 23 is a manually operable latching handle 24.

The flexible cable 22—23 runs over and is guided by a suitable guide pulley 25 which is mounted on the frame or chassis 12 of the truck 11 and from the guide pulley 25 the cable 23 extends rearwardly through a guide sleeve 26 which is mounted on the frame or chassis 12 of the truck, between the ends thereof.

The flexible cable 23 is divided or bifurcated, in any suitable manner, at the point where it runs through the guide sleeve 26 so as to form two rearwardly but oppositely extending arms 27.

Each of the arms 27 of the flexible cable 23 is connected at its rear end, as at 28, to the lower end portion 29 of a latch-controlling lever 30 which is pivotally mounted between its ends, as at 31, upon a movable arm 32. Each of the two movable arms 32 is, in turn, pivotally mounted as at 33 upon the corresponding one of two combination supporting and guiding structures, which are generally indicated at 34, and which are clamped about the rear axle housing 35 of the automotive vehicle truck or the like 11, said combination supporting and guiding structures 34 being secured in position by means of the shackle bolts 36 which support the rear springs 37a of the vehicle, as shown in Figs. 5 and 6.

One of the combination supporting and guiding structures 34 is associated with each of the rear wheels of the vehicle and each of these combination supporting and guiding structures 34 includes a lower combination supporting and guiding plate 37 which is provided, on its lower surface, with an angularly extending and channel-shaped slot 38, each of the movable members 32 being guided in one of the slots 38, for reasons which will be set forth presently.

Each of the tire-engaging and ground-gripping members 13 is carried by, and is suspended from, the corresponding movable member 32, of the related combination supporting and guiding structure 34, by means of a pair of resilient or spring arms 39 which are connected to opposite ends of the related movable member 32, each of the resilient or spring arms 39 being provided, between its ends, with one or more coils or convolutions 40.

Associated with the upper end portion 41 of each of the latch-controlling arms 29 is a latching device, generally indicated at 42. Each of these latching devices 42 includes a slidable yoke 43 and the upper end portion 41 of the corresponding lever 29 projects between the arms of the related yoke 43, as shown in Figs. 5, 8 and 11. Each of the slidable yokes 43 is urged forwardly (right to left, as seen in Fig. 8) by a spring 44 which is attached to the corresponding movable member 32. The other end of each of the slidable yokes 43 is connected to a latch dog 45 which is pivotally mounted at its lower end, as at 46, upon an angularly formed extension 47 of the corresponding movable member 32, and each of these latch dogs 45 is adapted to latchingly engage a latch keeper pin 48, one of which is provided at the rear end portion of each of the combination supporting and guiding plates 37, each of these latch keeper pins 48 extending across the corresponding one of the slots 38 (Fig. 11).

The construction and mounting of the tire-engaging and ground-gripping members 13 is shown in detail in Fig. 4. Each of said members 13 comprises a body 49 which is preferably made of at least six-ply combination fabric and rubber stock, and each of these bodies 49 is rotatably mounted upon an anti-friction device which includes anti-friction bearings or ball races 50 which are carried by a hub structure 51, and each of these hub structures 51 is, in turn, carried by the corresponding pair of resilient or spring arms 39. The body 49 of each of the members 13 is provided on its axially outer side with an annular rib 55, (Fig. 4), for a reason which will be explained hereinafter.

As shown in the drawings, each of the tire-engaging and ground-gripping members 13 has preferably at least three rows of anti-skid calks 16 mounted thereon and extending annularly therearound, and the preferred design of these calks is illustrated in Fig. 9, wherein it will be seen that each of the same has a head portion 52 anchored in the body 49 of the corresponding tire-engaging and ground-gripping member 13, and each of these calks 16 has a depending portion 19 which has a vertically extending straight-sided or flat front face 53 and an angularly extending rear face 54, for a reason which will be described presently.

In the use of the new anti-skid device, the tire-engaging and ground-gripping members 13 are normally held in raised or ineffective position, as in Figs. 1 and 2, by engagement of the latching handle 24 in the horizontally extending upper portion 21 of the bayonet slot 20, and when the tire-engaging and ground-gripping members 13 are disposed in ineffective or raised position, it will be noted, as shown in Figs. 1 and 2, that they are disposed inwardly of the axially inner sides of the rear tires 14 of the automotive vehicle truck, bus or the like 11 upon which the new anti-skid device is used.

However, if and when it is desired to use the new anti-skid device as, for example, when a truck or the like 11 engages an ice-covered, wet, or other slippery surface and begins to skid, the driver of the truck or the like may quickly release the tire-engaging and ground-gripping members 13 for movement into lowered or effective position, by simply manually moving the latching handle 24 (left to right, as seen in Fig. 3) out of the horizontally extending portion 21 and into the vertically extending portion of the bayonet slot 20, whereupon the tire-engaging and ground-gripping members 13 will drop by gravity into lowered and effective position, in which they are shown in Figs. 5 and 6, the movable members 32 and related parts carried thereby, including the tire-engaging and ground-gripping members 13, pivoting at 33 during this operation.

When the tire-engaging and ground-gripping members 13 are thus released for movement into lowered or effective position, they are, as stated above, pivoted at 33, and are guided outwardly toward and into engagement with, and into a position below, the rear tires 14 of the vehicle, this being accomplished by movement of the members 32 in the angularly extending and channel-shaped slots 38 which, it will be noted, extend at an angle relative to both the longitudinal and transverse axes of the vehicle, as shown in Fig. 7.

When the tire-engaging and ground-gripping members 13 are thus dropped into lowered and effective position, in engagement with but below the rear tires 14, and on the axially inner sides of the latter, they are latched in this lowered or effective position by engagement of the latch dogs 45 upon the latch keeper pins 48, one of the latch dogs 45 being shown in latched position in full lines and in unlatched position in dotted lines, in Fig. 8, and the tire-engaging and ground-gripping members 13 are resiliently urged into and retained in effective position, below the rear tires 14 of the vehicle, by means of the resilient or spring-supporting arms 30 and the spring coils or convolutions 40 therein.

It will be noted, in this connection, that each of the latch dogs 45 is normally urged into latching engagement with one of the latch keeper pins 48 (in the plate 37) by means of the corresponding slidable yoke 43 and spring 44, as shown in Fig. 8.

It will also be noted, by reference particularly to Figs. 4 and 9, that when the tire-engaging and ground-gripping members 13 are in lowered or effective position, the rear tires 14 of the vehicle bear thereon with their weight so as to urge a substantial number of the anti-skid calks 16 into engagement with the ice-covered, wet, or other slippery surface 15, and thus prevent or stop skidding of the vehicle.

It will be further noted, that when the tire-engaging and ground-gripping members 13 are in lowered and effective position, the anti-skid calks 16 will dig into the ice-covered, wet, or other slippery surface 15 with the substantially flat, straight-sided and vertically extending faces 53 thereof extending forwardly, that is, toward the front of the vehicle and, as may be seen by reference to Fig. 9, the shape of these calks 16 is such that the ground-engaging and flat or straight-sided front faces 53 thereof are reinforced by the metal which is provided in and by the angularly formed rear portions thereof, thus preventing breaking of the calks, and thereby prolonging their useful life and increasing their efficiency.

After the vehicle 14 with which the new anti-skid device is used has come to rest, and in order to move the tire-engaging and ground-gripping members 13 back into raised or ineffective position, it is necessary for the driver to pull slightly on the handle portion 24 of the flexible cable 22—23 so as to unlatch the latch dogs 45 from engagement with the latch keeper pins 48, thereby moving the same into dotted line or unlatched position, as shown in Fig. 8, whereupon the driver of the vehicle may reverse or drive the same rearwardly a few inches so as to move the rear tires 14 off from the tire-engaging and ground-gripping members 13.

In order to complete the raising of the thus unlatched and released tire-engaging and ground-gripping members 13 into raised or ineffective position, the driver of the vehicle then pulls the handle portion 24 of the flexible cable 22—23 upwardly in the bayonet slot 20 and into the horizontally extending portion 21 thereof. This movement acts, through the flexible cable 23—27, to pivot the members 32 and the tire-engaging and ground-gripping members 13 (and other parts carried thereby) at 32, into raised or ineffective position, and the tire-engaging and ground-gripping members 13 are held or latched in raised position by engagement of the latching handle 24 in the horizontal portion 21 of the bayonet slot 20.

It will be noted, in this connection, that as the tire-engaging and ground-gripping members 13 are thus moved into raised or ineffective position, they are moved axially inwardly, relative to the rear tires 14 of the vehicle, by movement of the pivotal members 32 in the channel-shaped guide slots 38 in the combination supporting and guiding plates 37, so that when the tire-engaging and ground-gripping members 13 are in their normal elevated or raised position, they are disposed substantially inwardly of, and out of the way of, the rear tires 14 of the vehicle, as best shown in Fig. 1.

It will be noted, particularly by reference to Fig. 4, that when the tire-engaging and ground-gripping members 13 are in lowered or effective position, as in Fig. 4, the axially inner lower tread portions of the tires 14 bear down upon the annular ribs or rib portions 55 of the members 13 and thus help to urge the members 13 into gripping engagement with an ice-covered or wet or other slippery surface 15 over which the vehicle is moving so as to prevent or retard skidding thereof.

It will be seen, therefore, from the foregoing description, considered in conjunction with the accompanying drawings, that the present invention affords a new and improved and relatively simple but efficient anti-skid device for use on automotive vehicle trucks, buses and the like, and hence accomplishes its intended objects including those specifically pointed out hereinbefore.

I claim:

1. In combination with an automotive vehicle, an anti-skid device comprising a pair of normally raised and ineffective yieldable tire-engaging and ground-gripping members each adapted to be moved into lowered and effective position in engagement with and below the tread of the tire of one of the rear wheels of said vehicle so as to be pressed by the weight of the vehicle into frictional engagement with a slippery surface over which the said vehicle may be moving so as to prevent or retard skidding of the vehicle, means for supporting said tire-engaging and ground-gripping members upon said vehicle, means for guiding said tire-engaging and ground-gripping members into and out of raised or ineffective position and into and out of lowered or effective position including a device for moving said tire-engaging and ground-gripping members axially outwardly relative to the said rear wheels of said vehicle during movement of said tire-engaging and ground-gripping members into lowered or effective position and axially inwardly relative to the said rear wheels of said vehicle during movement of said tire-engaging and ground-gripping members into raised or ineffective position, means for latching said tire-engaging and ground-gripping members in lowered or effective position beneath the tread of the tires of the rear wheels of said vehicle, and means for unlatching said tire-engaging and ground-gripping members for movement from effective or lowered position beneath the tires of the rear wheels of the said vehicle and for moving said tire-engaging and ground-gripping members into raised or ineffective position including a manually operable control member arranged in the driver's compartment of said vehicle.

2. A device as defined in claim 1 in which the means for unlatching the said tire-engaging and ground-gripping members and for moving the same into raised or ineffective position includes a flexible member movably guided upon the chassis or frame of the vehicle and having a portion extended into the driver's compartment of the vehicle and provided with a handle portion and in which a means is provided in the driver's compartment of the vehicle for normally latching said handle member to retain said tire-engaging and ground-gripping members in raised position.

3. A device as defined in claim 1 in which the means for unlatching the said tire-engaging and ground-gripping members and for moving the same into raised or ineffective position includes a flexible member movably guided upon the chassis or frame of the vehicle and having a portion extended into the driver's compartment of the vehicle and provided with a handle portion and in which a means is provided in the driver's compartment of the vehicle for normally latching said handle member so as to retain said tire-engaging and ground-gripping members in raised position and in which the means for latching said handle member includes a bayonet slot provided in a vertically extending front wall of the driver's seat and having a horizontally extending end portion in which the said handle member is normally disposed and latched.

4. A device as defined in claim 1 in which the means for unlatching the said tire-engaging and ground-gripping members and for moving the same into raised or ineffective position includes a flexible member movably guided upon the chassis of the vehicle having a portion extended into the driver's compartment of the vehicle and provided with a handle portion and in which a means is provided in the driver's compartment of the vehicle for normally latching said handle member so as to retain said tire-engaging and ground-gripping members in raised position and in which said flexible member is bifurcated between its ends to provide a pair of rearwardly extending arms and which device includes means, connected to the rear end portions of the rearwardly extending arms of said flexible members, for unlatching said tire-engaging and ground-gripping members from lowered or ineffective position for movement into raised or ineffective position.

5. A device as defined in claim 1 in which each of the tire-engaging and ground-gripping members is supported by a pair of resilient spring arms provided with at least one spring coil or convolution between the ends thereof so as to retain said tire-engaging and ground-gripping members yieldably beneath the tires of the rear wheels of said vehicle when in said lowered or effective position.

6. A device as defined in claim 1 in which each of the tire-engaging and ground-gripping members is supported by a pair of resilient spring arms provided with at least one spring coil or convolution between the ends thereof so as to retain said tire-engaging and ground-gripping members yieldably beneath the tires of the rear wheels of said vehicle when in said lowered or effective position and in which each of said tire-engaging and ground-gripping members is rotatably mounted upon an anti-friction bearing hub structure carried by said resilient arms.

7. A device as defined in claim 1 in which each of said tire-engaging and ground-gripping members includes a combination rubber and fabric body having annularly extending rows of anti-friction calks mounted therein in the external peripheral surface thereof.

8. A device as defined in claim 1 in which each of said tire-engaging and ground-gripping members includes a combination rubber and fabric body having annularly extending rows of anti-friction calks mounted therein and in which each of said anti-friction calks includes a substantially vertically extending and straight-sided flat front face and an angularly extending rear portion reinforcing each of said front faces.

9. A device as defined in claim 1 in which each of said tire-engaging and ground-gripping members comprises a substantially disc-shaped resilient body rotatably mounted upon an anti-friction bearing hub structure and in which each of said tire-engaging and ground-gripping members is provided in its external peripheral surface with rows of anti-friction calks and in which each of said tire-engaging and ground-gripping members has an annular rib formed on its axially outer peripheral surface and against which the tire of the corresponding one of said rear wheels of the vehicle is adapted to bear when said tire-engaging and ground-gripping members are in lowered or effective position.

10. A device as defined in claim 1 in which the means for guiding said tire-engaging and ground-gripping members into and out of effective positions includes a combination supporting and guiding plate mounted upon the rear axle housing of the vehicle and provided on its lower surface with a substantially channel-shaped guide slot extending angularly relative to both the longitudinal and transverse axes of the vehicle and in which said anti-skid device includes a movable member pivotally mounted upon the vehicle below the rear axle housing thereof and engageable in said slot and in which each of said tire-engaging and ground-gripping members is carried by one of said movable members.

11. A device as defined in claim 1 in which the means for guiding said tire-engaging and ground-gripping members into and out of effective positions includes a combination supporting and guiding plate mounted upon the rear axle housing of the vehicle and provided on its lower surface with a substantially channel-shaped slot extending angularly relative to both the longitudinal and transverse axes of the vehicle and in which said anti-skid device includes a movable member pivotally mounted upon the vehicle below the rear axle housing thereof and engageable in said slot and in which the means for latching said tire-engaging and ground-gripping members in lowered or effective position includes a latch dog pivotally mounted on said movable member and engageable in a latch or keeper slot provided in said combination supporting and guiding plate.

WM. E. GERTH.